United States Patent
Akiyama et al.

(10) Patent No.: US 7,129,964 B2
(45) Date of Patent: Oct. 31, 2006

(54) IMAGE PRINTING APPARATUS AND IMAGE PRINTING METHOD

(75) Inventors: Takeshi Akiyama, Kawasaki (JP); Isamu Ozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 178 days.

(21) Appl. No.: 11/003,521

(22) Filed: Dec. 6, 2004

(65) Prior Publication Data

US 2006/0001734 A1    Jan. 5, 2006

(30) Foreign Application Priority Data

Dec. 11, 2003    (JP) .............................. 2003-413818

(51) Int. Cl.
G03G 21/00    (2006.01)
B41J 2/447    (2006.01)

(52) U.S. Cl. ...................... 347/235; 399/301; 347/118

(58) Field of Classification Search ........ 347/116–119, 347/235, 250; 399/301
See application file for complete search history.

(56) References Cited

U.S. PATENT DOCUMENTS 4,853,710 A    8/1989  Shimada et al. ............ 346/108
5,808,772 A *  9/1998  Yamaguchi et al. ........ 359/204
6,380,960 B1*  4/2002  Shinohara ................... 347/116
6,381,435 B1*  4/2002  Shinohara et al. .......... 399/301
6,466,243 B1  10/2002  Takahashi ................... 347/116
6,711,364 B1*  3/2004  Shinohara ................... 399/49
6,853,392 B1*  2/2005  Maeda ........................ 347/116

FOREIGN PATENT DOCUMENTS

JP    2001-13430    1/2001
JP    2001-71554    3/2001

* cited by examiner

*Primary Examiner*—Huan Tran
(74) *Attorney, Agent, or Firm*—Fitzpatrick, Cella, Harper & Scinto

(57) ABSTRACT

In a multibeam-type image printing apparatus, a process of adjusting a beam scanning position at which a photosensitive body is scanned is simplified. More specifically, consumption of a developing agent such as toner or the like is suppressed, and the time required for the adjustment process is shortened. A test pattern is formed on the photosensitive body using the first beam out of a plurality of beams, thereby detecting the irradiation position of the first beam with respect to the photosensitive body. Correction data for all the beams are generated on the basis of adjustment data as the detection result and predetermined beam information (information indicating a relative positional relationship between the plurality of beams on the photosensitive body). Image transfer clocks and scanning start positions are set on the basis of the correction data.

16 Claims, 13 Drawing Sheets

IMAGE PRINTING APPARATUS AND IMAGE PRINTING METHOD

FIELD OF THE INVENTION

The present invention relates to an image printing apparatus and image printing method which print an image using a plurality of beams.

BACKGROUND OF THE INVENTION

There is available an image printing apparatus which forms a latent image on a photosensitive body while scanning the photosensitive body using a beam, develops the latent image using toner, and transfers the image onto a recording medium. Examples of such image printing apparatus include a multibeam image printing apparatus which forms a latent image using a plurality of beams.

Assume that in a general multibeam image printing apparatus, all beams have the same image transfer clock and same synchronous detection signal. In this case, since the beams have different optical path lengths, an image as schematically shown in FIG. 13 is obtained as a latent image to be formed or an image developed and transferred onto a recording medium. This means that a plurality of beams have different main scanning widths.

To adjust a difference in main scanning width between beams, there is available a method of forming test patterns on a photosensitive body by the beams, detecting the positions of the patterns by a sensor, and adjusting the image transfer clocks and scanning start positions on the basis of the positions. The test pattern formation, position detection, and position-based beam scanning position (irradiation position) adjustment are executed for each of the plurality of beams.

As prior-art references that pertain to an image printing apparatus using a plurality of beams, there are Japanese Patent Laid-Open Nos. 2001-013430 and 2001-071554. Japanese Patent Laid-Open No. 2001-013430 discloses an arrangement which executes four-line scanning. In the arrangement, a time period between a synchronous detection signal for each line detected by a photodetector and a synchronous detection signal at a trailing edge of each line detected by the photodetector is counted, the image transfer clocks for the four lines are controlled on the basis of the count values such that the magnifications of the respective beams on the photosensitive body are constant and equal.

In a method of forming test patterns for all of a plurality of beams and adjusting beam scanning positions, the amount of toner used increases in proportion to the number of beams, and test pattern formation and test pattern position detection need to be repeated a number of times equal in number to the beams. For example, a four-beam, four-color multibeam printer needs scanning position adjustment for 16 beams in total. This printer requires toner enough to develop test patterns for the 16 beams. Since test pattern formation and test pattern position detection are executed for each of the 16 beams, the calibration time becomes longer.

SUMMARY OF THE INVENTION

The present invention has been made on the basis of the recognition of the above-mentioned problems, and has as its object to simplify a process of adjusting a beam scanning position at which a photosensitive body is scanned. More specifically, the present invention takes into consideration suppression of consumption of a developing agent such as toner or the like and reduction in time required for the adjustment process.

According to the present invention, there is provided an image printing apparatus which prints an image using a plurality of beams, comprising a beam irradiation unit which irradiates a photosensitive body with the plurality of beams, a detection unit which detects irradiation positions of at least some of the plurality of beams with respect to the photosensitive body, and a correction unit which corrects the irradiation position of each of the plurality of beams with respect to the photosensitive body on the basis of predetermined beam information and the irradiation positions detected by the detection unit.

According to a preferred embodiment of the present invention, test patterns can be formed by developing latent images formed on the photosensitive body by the at least some beams. In this case, the detection unit can be arranged to detect the irradiation positions of the at least some beams with respect to the photosensitive body by detecting positions of the test patterns. Alternatively, latent images formed on the photosensitive body by the at least some beams may be developed and then transferred by a transfer unit. In this case, the detection unit can be arranged to detect the irradiation positions of the at least some beams with respect to the photosensitive body by detecting positions of images transferred by the transfer unit.

According to a preferred embodiment of the present invention, the irradiation positions can comprise scanning start positions and scanning lengths of the at least some beams for the photosensitive body.

According to a preferred embodiment of the present invention, the detection unit can be arranged to detect the irradiation positions of the at least some beams with respect to the photosensitive body by detecting a relative position of the photosensitive body with respect to the beam irradiation unit.

According to a preferred embodiment of the present invention, the detection unit can include a surface sensor and detect the relative position of the photosensitive body using positions at which the surface sensor is irradiated with the at least some beams reflected by a reflection unit provided for the photosensitive body. In this case, the reflection unit can be arranged at an end of the photosensitive body.

According to a preferred embodiment of the present invention, the beam information can include information indicating a relative positional relationship between the plurality of beams on the photosensitive body.

According to the present invention, there is provided an image printing method of printing an image using a plurality of beams, comprising a detection step of detecting irradiation positions of at least some of the plurality of beams with respect to a photosensitive body, and a correction step of correcting the irradiation position of each of the plurality of beams with respect to the photosensitive body on the basis of predetermined beam information and the irradiation positions detected in the detection step.

According to the present invention, a process of adjusting a beam scanning position at which a photosensitive body is scanned can be simplified. This can contribute to, e.g., suppression of consumption of a developing agent such as toner or the like and reduction in time required for the adjustment process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A specific operation example of an image printing apparatus which forms test patterns for respective beams and detects the positions of the formed test patterns will be described first as a comparative example.

Figure 11:
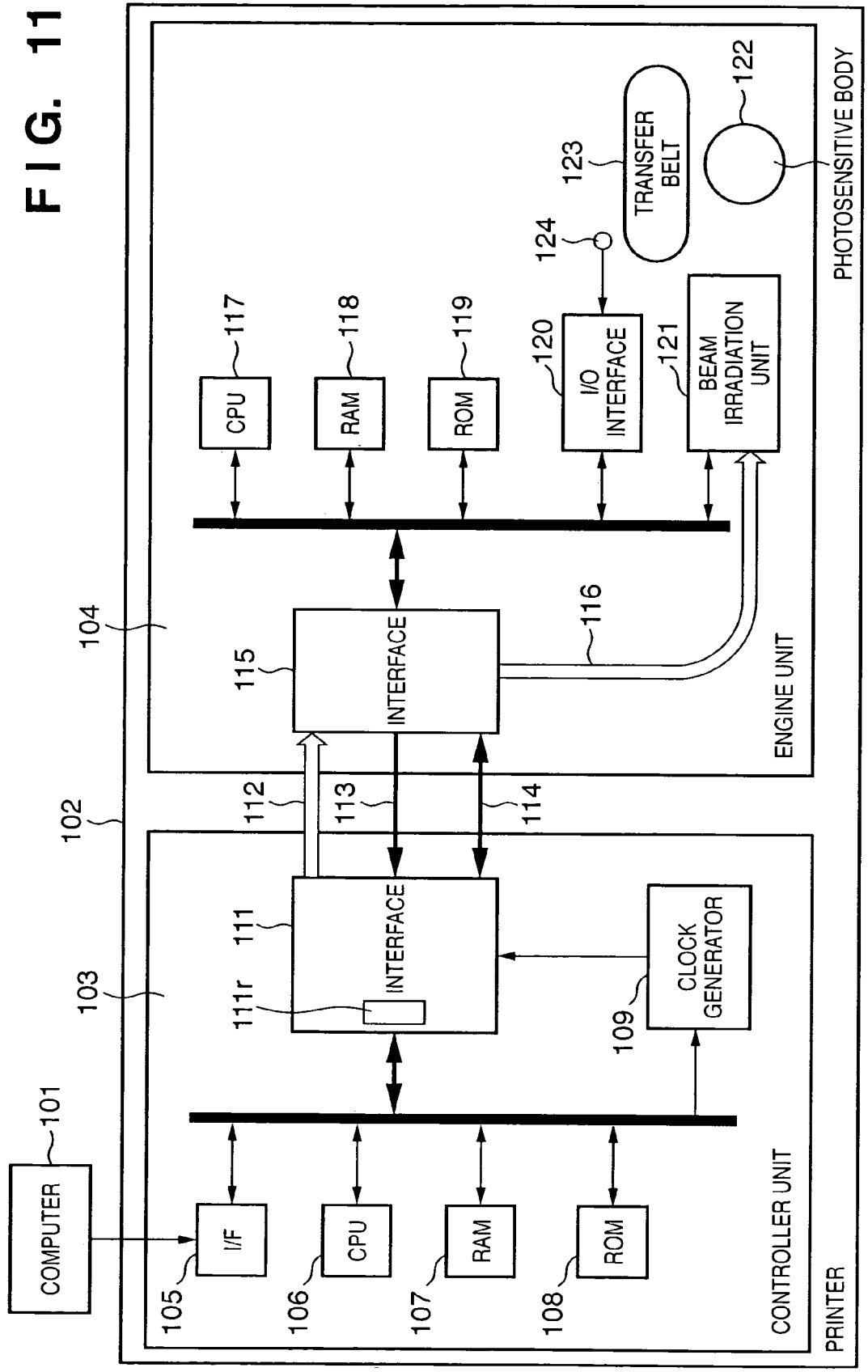
FIG. 11 is a block diagram showing the arrangement of a multibeam-type laser beam printer as a comparative example.

FIG. 11 is a block diagram showing the arrangement of a multibeam-type laser beam printer (image printing apparatus). A printer 102 is connected to one or more computers 101 through an interface 105 such as a network interface or the like and receives print data from the computers 101.

A printer 102 mainly comprises a controller unit 103 which controls the printer 102 and an engine unit 104 which outputs an image.

The controller unit 103 comprises the interface 105, which receives print data from the computers 101, a CPU 106 which characterizes functions of the controller unit 103 or printer 102 in accordance with a control program, and a ROM 108 which stores the control program or the like.

The controller unit 103 further comprises a RAM 107 which temporarily stores image data generated based on print data, detection data received from the engine unit 104, correction data generated by the CPU 106 to correct a beam irradiation position in a main scanning direction, and the like, a clock generator 109 which generates separate image transfer clocks for a plurality of beams in accordance with the correction data, and an interface 111 which exchanges data with the engine unit 104. The interface 111 has a register 111r to hold data which designates a scanning start position generated by the CPU 106.

The engine unit 104 comprises an interface 115 which exchanges data with the controller unit 103, a photosensitive body (photosensitive drum) 122, a beam irradiation unit 121 which irradiates the photosensitive body 122 with beams to form an electrostatic latent image, a signal line 116 which transfers image data from the interface 115 to the beam irradiation unit 121 in accordance with an image clock, a ROM 119 which stores a control program, a CPU 117 which controls the engine unit 104 in accordance with the control program stored in the ROM 119, and a RAM 118 which temporarily stores various types of data to control the engine unit 104.

The engine unit 104 further comprises a sensor 124 which detects the position of a test pattern formed of toner on a transfer belt 123 on the basis of an electrostatic latent image for a test pattern formed by the photosensitive body 122, and an I/O interface 120 which connects the sensor 124 and a bus 125. On the basis of the position of the test pattern detected by the sensor 124, information as to the actual scanning position of a beam (a position at which the photosensitive body 122 is actually irradiated with the beam) can be obtained.

A signal line 112 which transfers image data from the controller unit 103 to the engine unit 104, a signal line 113 which transfers a control signal including an image synchronizing signal (BD) that controls the engine unit 104, and a signal line 114 which sends/receives a control signal between the controller unit 103 and the engine unit 104 are connected between the interfaces 111 and 115.

Figure 12:
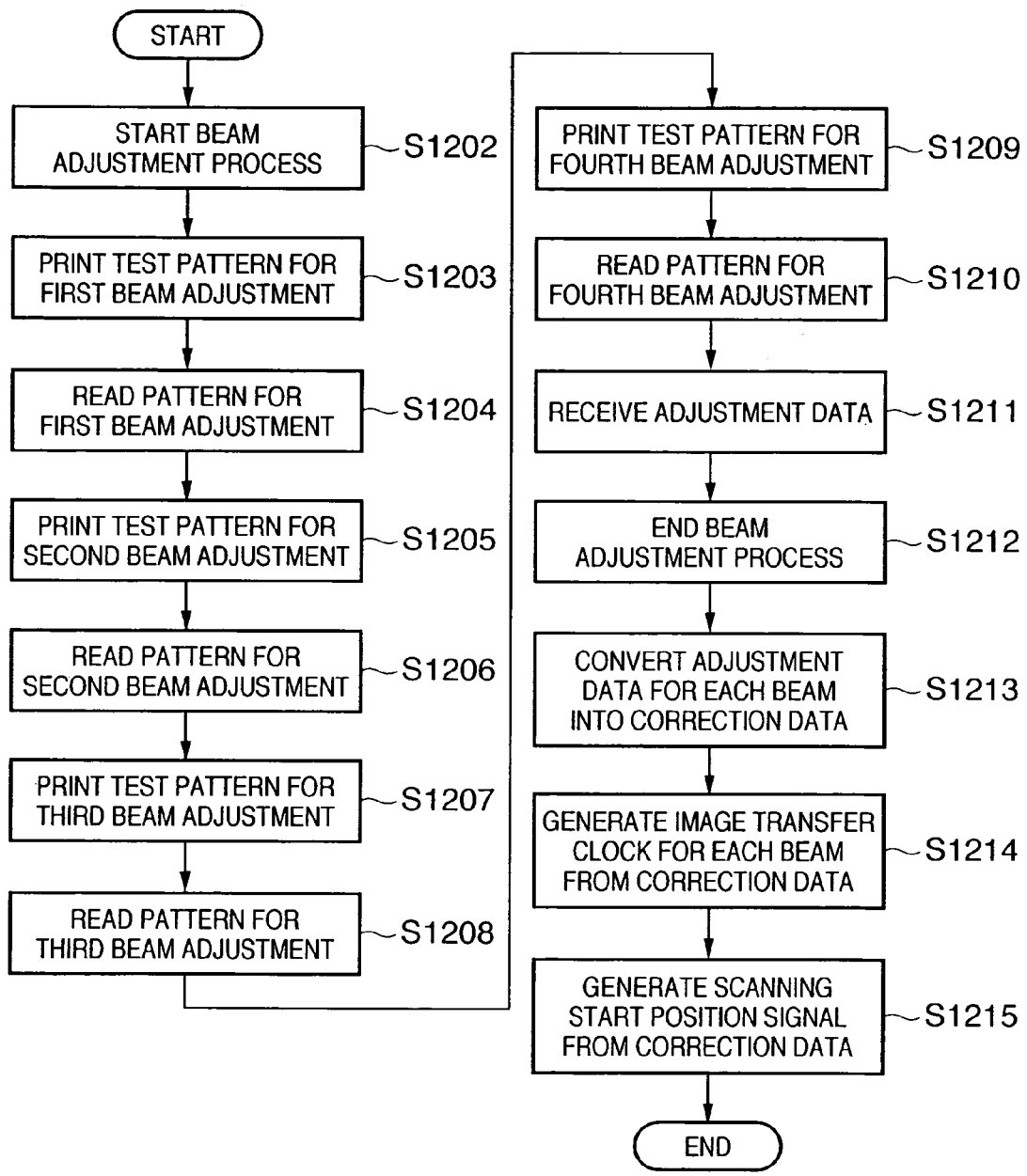
FIG. 12 is a flowchart showing the operation of the printer shown in FIG. 11.
Figure 13:
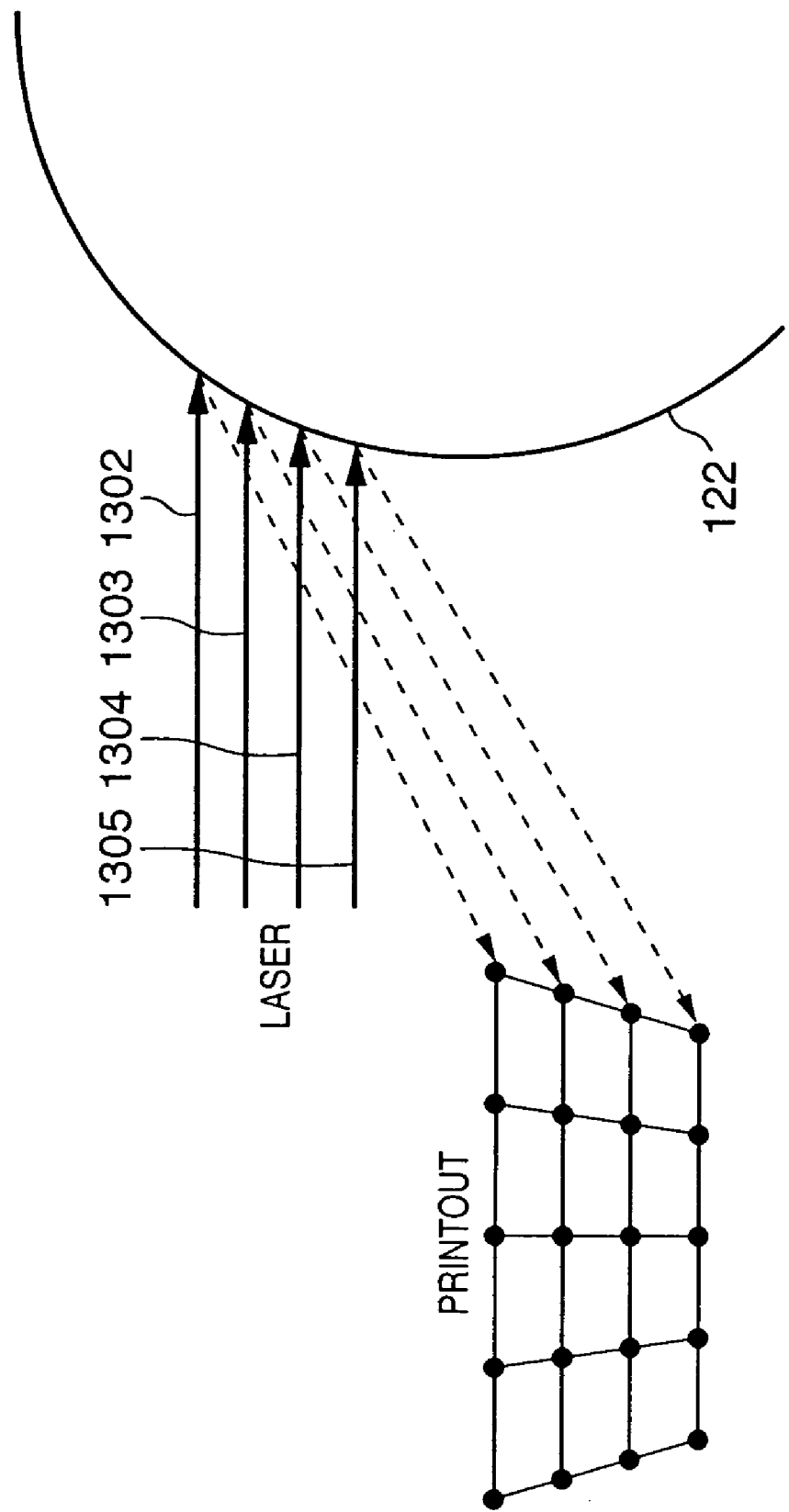
FIG. 13 is a view for explaining a difference in scanning width caused by a difference in optical path length.

FIG. 12 is a flowchart showing the operation of the printer 102 shown in FIG. 11. In step S1202, the controller unit 103 sends the engine unit 104 a control signal which gives an instruction to start beam adjustment, thereby causing the engine unit 104 to start a beam adjustment process (process of obtaining information required for beam adjustment).

In step S1203, to adjust the first beam, the engine unit 104 forms an electrostatic latent image for a test pattern on the photosensitive body 122 by the beam irradiation unit 121 and develops the electrostatic latent image using toner to form the test pattern on the transfer belt 123. In step S1204, the sensor 124 detects the position of the test pattern formed of toner on the transfer belt 123. The above-mentioned process is repeated in steps S1205 to S1210 for the other three beams.

In step S1211, a result of detecting the test pattern positions for the four beams is transferred as adjustment data from the engine unit 104 to the controller unit 103.

In step S1212, the controller unit 103 sends, in response, a control signal which gives an instruction to end the beam adjustment process to the engine unit 104, thereby causing the engine unit 104 to end the beam adjustment process.

In step S1213, the CPU 106 of the controller unit 103 converts adjustment data for each of the four beams into correction data (one for correcting the main scanning magnification and the other for correcting the scanning start position).

In step S1214, the CPU 106 sets the correction data for correcting the respective main scanning magnifications in the clock generator 109. The cycle of the image transfer clock for each of the four beams is adjusted such that the main scanning magnification has an appropriate value.

In step S1215, the correction data for correcting the respective scanning start positions are set in the register 111r of the interface 111. With this operation, the scanning start positions of the four beams are so adjusted as not to shift from each other.

As described above, an image printing apparatus which forms test patterns for a plurality of beams and detects the positions of the test patterns requires an adjustment process to be repeated a number of times equal in number to the beams. For this reason, toner is consumed correspondingly, and the processing time for calibration and the like becomes longer.

The present invention has as its object to reduce the disadvantage of such repetitive operation. In a preferred embodiment of the present invention, for at least some (e.g., one) of a plurality of beams for image printing, correction data is generated by test pattern formation. For the remaining beams, correction data is generated on the basis of their adjustment data and predetermined beam information.

Figure 1:
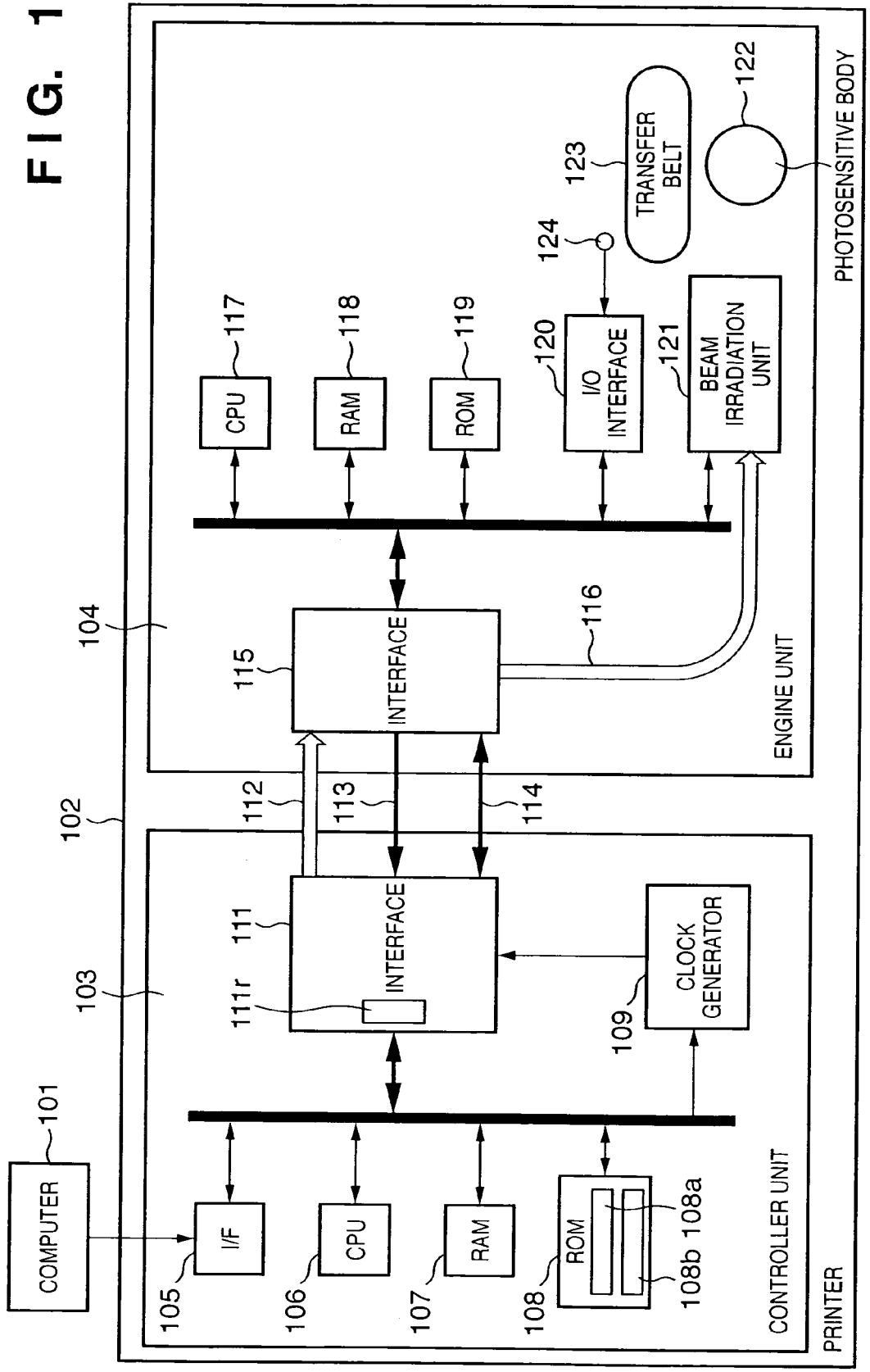
FIG. 1 is a block diagram showing the arrangement of a multibeam-type laser beam printer (image printing apparatus) according to a preferred embodiment of the present invention.

FIG. 1 is a block diagram showing the arrangement of a multibeam-type laser beam printer (image printing apparatus) according to a preferred embodiment of the present invention. Note that the same reference numerals in FIG. 1 denote the same components as those in FIG. 11, and a description thereof will be omitted.

A control program 108a and beam information 108b are stored in a ROM 108 of a controller unit 103. A CPU 106 characterizes functions of the controller unit 103 or a printer 102 by operating in accordance with the control program 108a.

Figure 2:
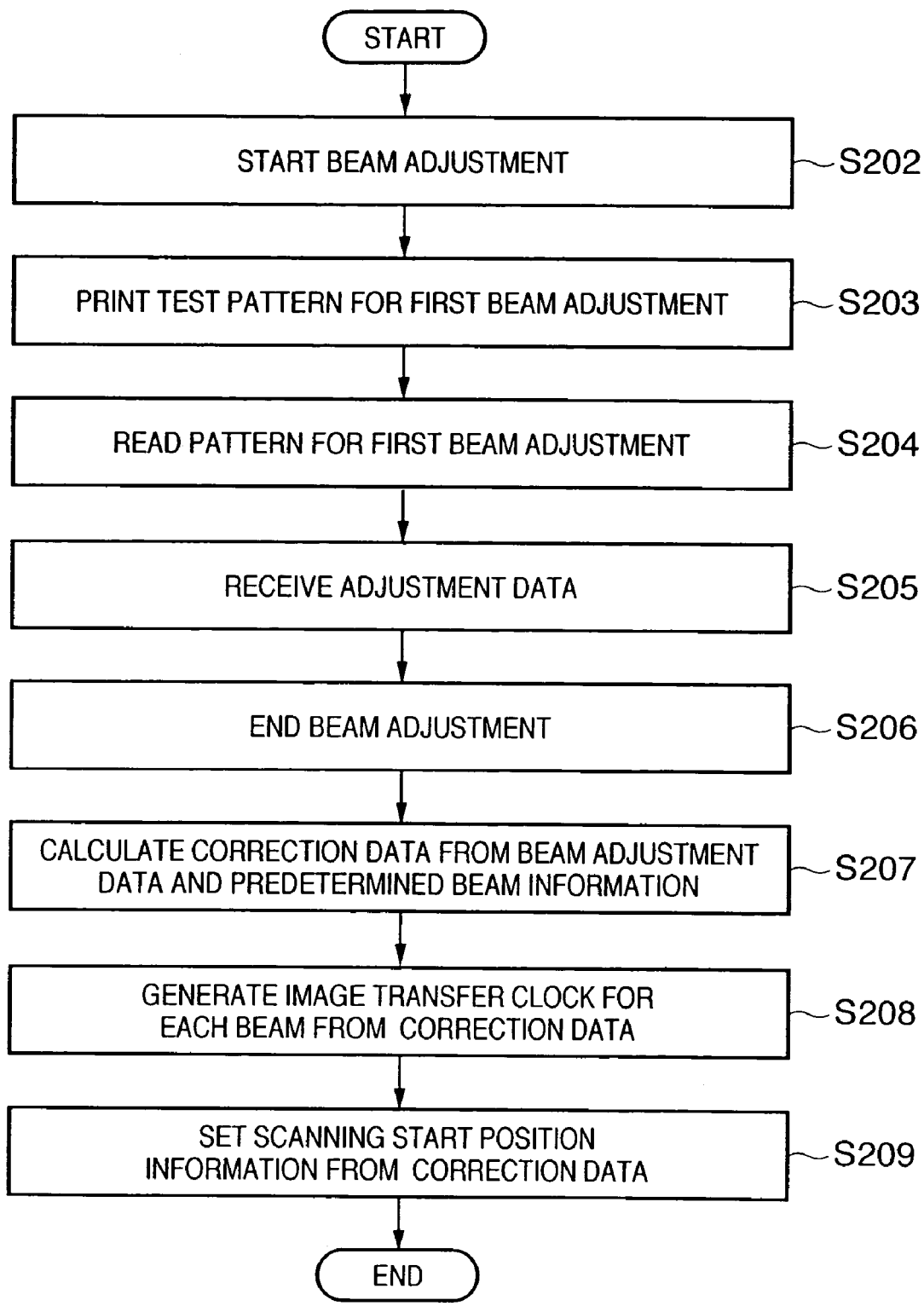
FIG. 2 is a flowchart showing the operation of the printer shown in FIG. 1.

FIG. 2 is a flowchart showing the operation of the printer shown in FIG. 1. The operation of the controller unit 103 is controlled by the CPU 106 in accordance with the control program 108a while the operation of an engine unit 104 is controlled by a CPU 117 in accordance with a control program stored in a ROM 119.

In step S202, the controller unit 103 sends the engine unit 104 a control signal which gives an instruction to start beam adjustment, thereby causing the engine unit 104 to start a beam adjustment process (process of obtaining information required for beam adjustment).

In step S203, the engine unit 104 forms an electrostatic latent image for a test pattern on a photosensitive body 122 by a beam irradiation unit 121 using the first beam out of a plurality of beams (in this example, four beams) and develops the electrostatic latent image using toner to form the test pattern on a transfer belt 123.

In step S204, a sensor 124 detects the position of the test pattern formed on the transfer belt 123.

In step S205, the controller unit 103 receives, as adjustment data, a result of detecting the position of the test pattern formed by the first beam from the engine unit 104. In step S206, the controller unit 103 sends a control signal which gives an instruction to end the beam adjustment process to the engine unit 104, thereby causing the engine unit 104 to end the beam adjustment process.

In step S207, the CPU 106 of the controller unit 103 generates, by calculation, correction data for each of the first, second, third, and fourth beams on the basis of the adjustment data obtained for the first beam and the beam information 108b stored in the ROM 108. For example, the beam information 108b may contain information that pertains to a relative positional shift between the first, second, third, and fourth beams. Such information may be a design value or may be obtained by examination (actual measurement). A correction data calculation method will be described later.

In step S208, the CPU 106 sets the correction data for correcting respective main scanning magnifications in a clock generator 109. This adjusts the cycle of the image transfer clock for each of the four beams such that the main scanning magnification has an appropriate value. In step S209, the correction data for correcting respective scanning start positions are set in a register 111r of an interface 111. This adjusts the scanning start positions of the four beams so as not to shift from each other. Since the main scanning magnification and scanning start position are appropriately set for each beam, the scanning positions in the main scanning direction of the beams coincide with each other, thereby eliminating a positional shift in pixel between lines in a main scanning direction. Note that the sensor 124 detects, e.g., the scanning start position and scanning length of one line of the first beam. In this embodiment, a test pattern is formed on the transfer belt, and the sensor reads the test pattern. However, a test pattern (patch) may be formed on the photosensitive body, and the sensor may read the test pattern (patch) on the photosensitive body.

Figure 3:
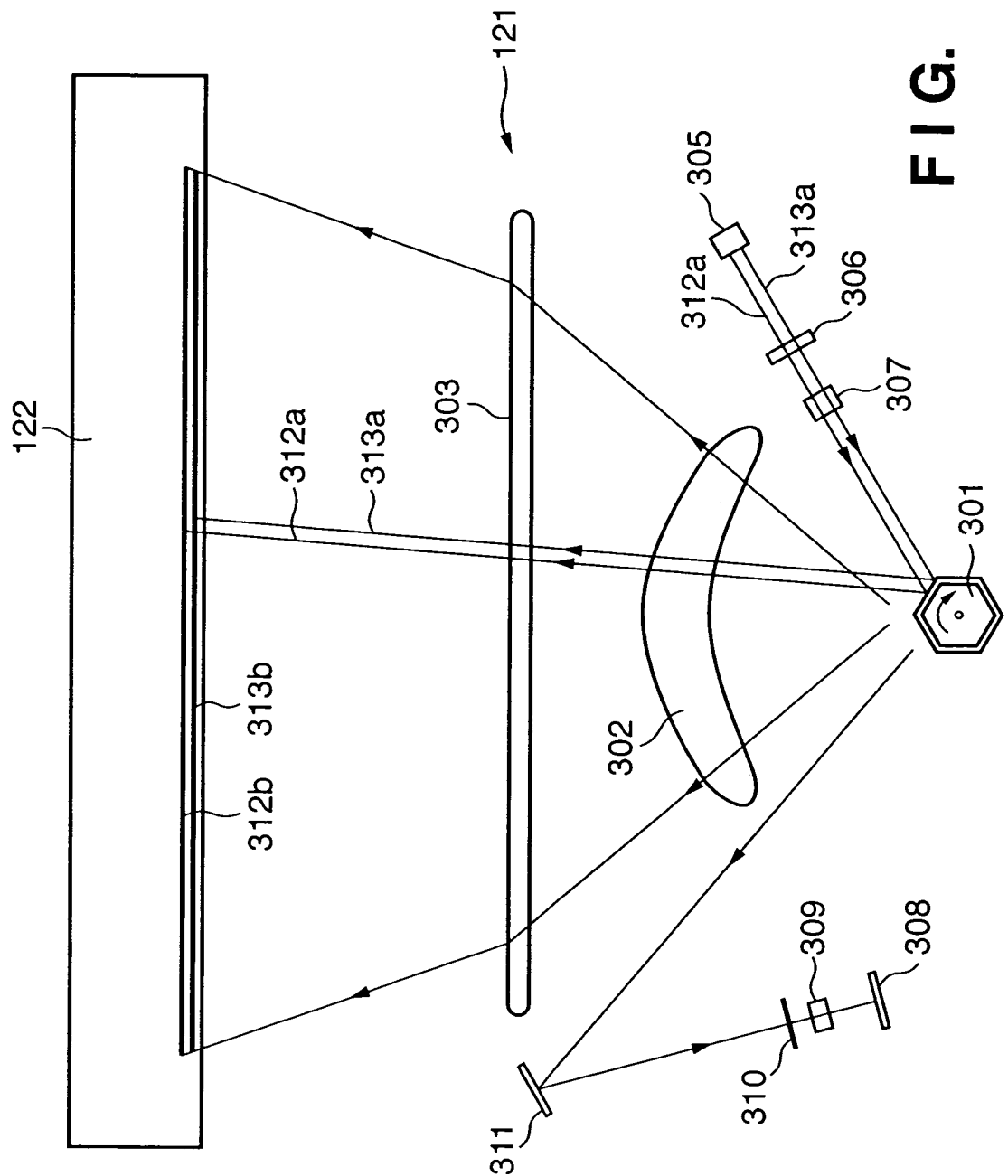
FIG. 3 is a view showing the layout of a beam irradiation unit and photosensitive body.
Figure 4:
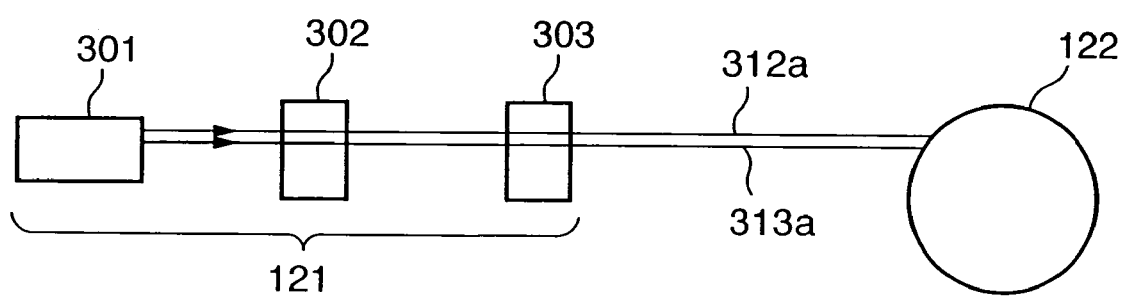
FIG. 4 is a view showing the layout of the beam irradiation unit and photosensitive body.

FIGS. 3 and 4 are views showing the layout of the beam irradiation unit 121 and photosensitive body 122. FIGS. 3 and 4 show only two of the four beams for the sake of descriptive simplicity. Reference numeral 301 denotes a deflector such as a rotating polyhedral mirror (polygon mirror) or the like. The deflector 301 is rotated and driven at a constant speed by a driving means such as a motor (not shown). Reference numerals 302 and 303 denote optical lenses for causing deflected laser beams to form a spot-like image on the photosensitive body 122. Each of the optical lenses 302 and 303 can comprise, e.g., a toric lens, diffraction optical element, or the like. The photosensitive body 122 is formed as a photosensitive drum having an almost cylindrical shape. Reference numeral 305 denotes a laser beam output unit which has a plurality of (in this example, four) laser beam sources.

Reference numeral 306 denotes a collimator lens which makes a plurality of (in this example, four) laser beams emitted from the laser beam output unit 305 parallel to each other; and 307, a cylindrical lens which has a predetermined refracting power in a sub-scanning direction.

Reference numeral 308 denotes an optical sensor serving as a synchronous sensing element. The optical sensor 308 provides timings to adjust the start position of beam scanning for forming a latent image on the surface of the photosensitive body 122 (scanning start position). Reference numeral 309 denotes a correction mirror for synchronous detection which corrects any optical face tangle error of a return mirror 311 (to be described later). Reference numeral 310 denotes a slit plate for synchronous detection which is arranged optically equivalent to the surface of a photosensitive body 304 and determines the write position of an image. Reference numeral 311 denotes the return mirror which reflects a laser beam toward the synchronous sensing element 308 to adjust timings for scanning start positions on the surface of the photosensitive body 304. Each of the synchronous sensing element 308, correction mirror 309, slit 310, and return mirror 311 constitutes an element of a synchronous position detector (BD optical system).

Reference numerals 312a and 313a denote two laser beams emitted from the laser output unit 305. Reference numerals 312b and 313b denote the scanning lines of the laser beams 312a and 313a. As can be seen from FIGS. 3 and 4, since the photosensitive body 122 has a curved surface (cylindrical surface), the photosensitive body 122 is irradiated with a plurality of laser beams reflected by the polygon mirror 301 at different positions in the sub-scanning direction. For this reason, a difference occurs in optical path length between the plurality of beams, thereby causing a difference in scanning length between the beams.

In this embodiment, the beam information 108b indicating the relative positional relationship between beams on the photosensitive body 122 is stored in advance in the ROM 108. As for only some of the plurality of beams, adjustment data indicating the respective irradiation positions with respect to the photosensitive body 122 are obtained by measurement. On the basis of the adjustment data and the beam information 108b stored in the ROM 108, the irradiation positions on the photosensitive body 122 are calculated for the remaining beams. With this operation, the irradiation positions with respect to the photosensitive body 122 for all the beams can be obtained, and the main scanning magnifications and scanning start positions can be adjusted on the basis of the irradiation positions.

The beam information 108b can be obtained by calculating a difference in optical path length between the beams on the basis of the shape of the photosensitive body 122 and the optical relationship between the photosensitive body 122 and the polygon mirror 301 and calculating the relative position between the beams on the photosensitive body 122 on the basis of the difference.

Figure 5:
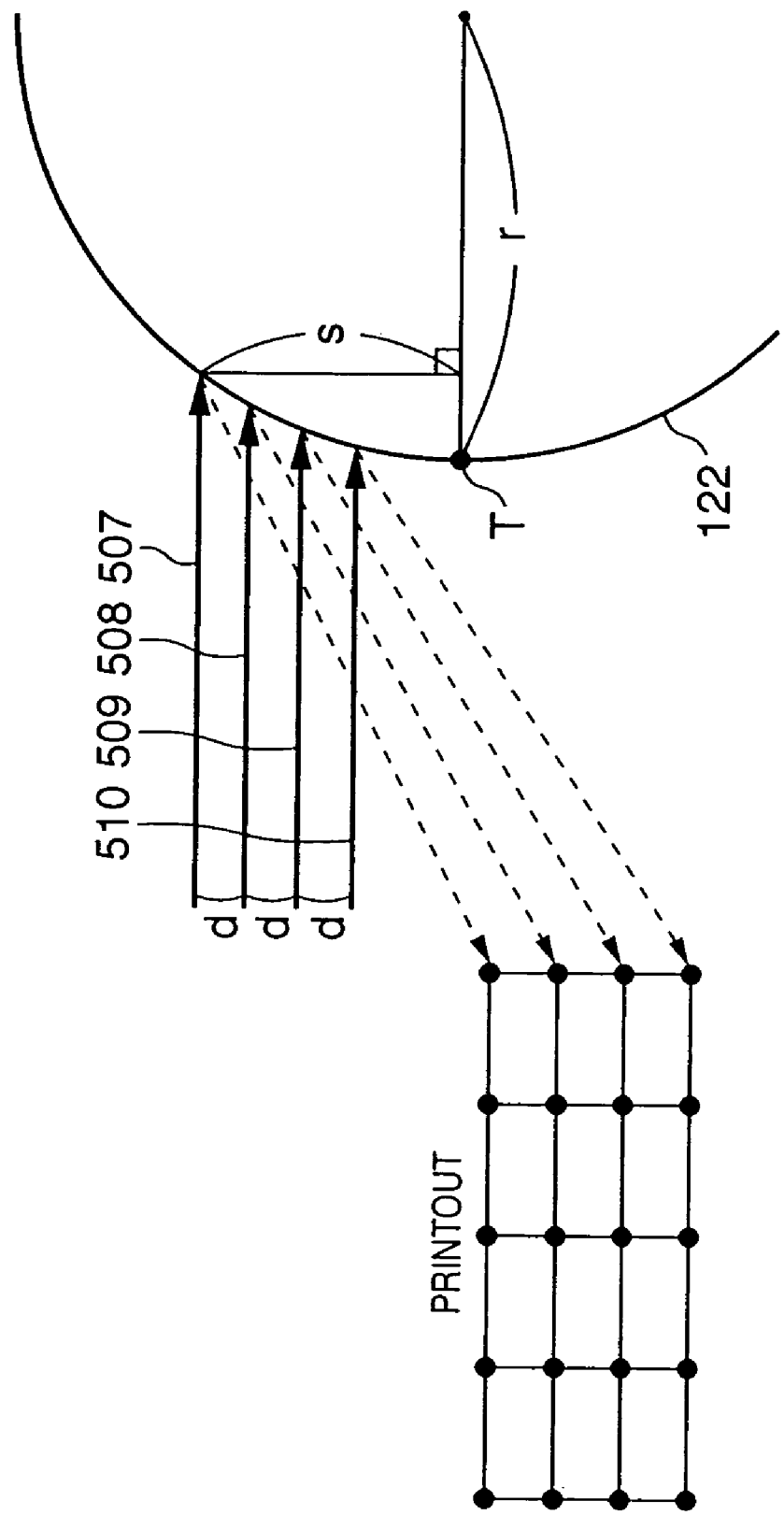
FIG. 5 is an enlarged view of a part of FIG. 4.
Figure 6:
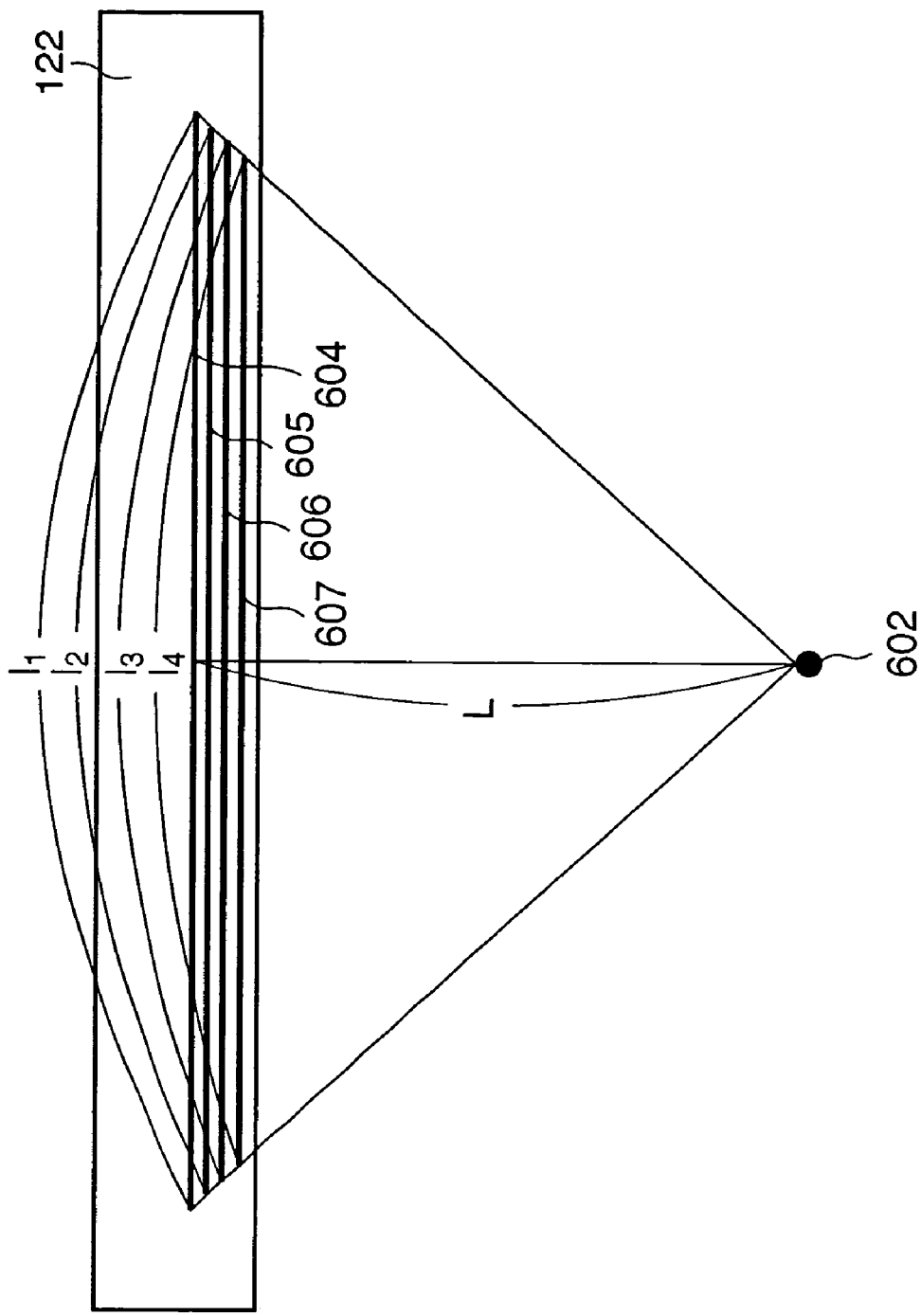
FIG. 6 is an enlarged view of a part of FIG. 3.

FIGS. 5 and 6 are enlarged views of the photosensitive body 122. In FIG. 5, reference symbol r denotes the radius of the photosensitive body 122; s, a distance from a point T on the photosensitive body 122 to a first beam 507; and d, a distance between beams with which the photosensitive body 122 is to be irradiated. Reference numeral 507 denotes the first beam; 508, a second beam; 509, a third beam; and 510, a fourth beam. The point T is closest on the surface of the photosensitive body 122 to the polygon mirror 301. In FIG. 6, reference numeral 602 denotes the optical position of the polygon mirror 301 as seen from the photosensitive body 122. Reference symbol L denotes an optical distance from the photosensitive body 122 to a scanning line 604 of the first beam 507. Reference numerals 604 to 607 denote scanning lines corresponding to the first beam 507 to fourth beam 510. Reference symbols $l_1$ to $l_4$ denote the scanning lengths of the scanning lines 604 to 607.

A method of correcting the scanning length of each beam on the basis of the adjustment data obtained for the first beam by the beam adjustment process will be described next.

As shown in FIG. 5, an optical path length difference $\Delta L_1$ between the first beam 507 and the second beam 508 is represented by equation (1):

$$\Delta L_1 = \sqrt{r^2 - s^2} - \sqrt{r^2 - (s+d)^2} \tag{1}$$

An optical path length difference $\Delta L_2$ between the first beam 507 and the third beam 509 and optical path length difference $\Delta L_3$ between the first beam 507 and the fourth beam 510 are respectively represented by equations (2) and (3):

$$\Delta L_2 = \sqrt{r^2 - s^2} - \sqrt{r^2 - (s+2d)^2} \tag{2}$$

$$\Delta L_3 = \sqrt{r^2 - s^2} - \sqrt{r^2 - (s+3d)^2} \tag{3}$$

where r represents the radius of the photosensitive body 122, s represents the distance from the point T on the photosensitive body 122 to the first beam 507, and d represents the distance between beams, as described above.

Letting $l_1$ be the scanning length of the first beam, the scanning length $l_2$ of the second beam is represented by equation (4):

$$l_2 = \frac{L - \Delta L_1}{L} * l_1 \tag{4}$$

The scanning length $l_3$ of the third beam and the scanning length $l_4$ of the fourth beam are respectively represented by equations (5) and (6):

$$l_3 = \frac{L - \Delta L_2}{L} * l_1 \tag{5}$$

$$l_4 = \frac{L - \Delta L_3}{L} * l_1 \tag{6}$$

where L represents the optical distance to the polygon mirror 301 as seen from the photosensitive body 122, $l_1$ represents the scanning length of the first beam, $l_2$ represents the scanning length of the second beam, $l_3$ represents the scanning length of the third beam, and $l_4$ represents the scanning length of the fourth beam, as described above.

A difference $\Delta d_{12}$ of the scanning start position of the second beam with respect to the first beam, i.e., a shift in the main scanning direction of the second beam with respect to the first beam on the photosensitive body 122 is represented by equation (7):

$$\Delta d_{12} = \frac{l_1 - l_2}{2} \tag{7}$$

A difference $\Delta d_{13}$ of the scanning start position of the third beam with respect to the first beam, i.e., a shift in the main scanning direction of the third beam with respect to the first beam on the photosensitive body 122 is represented by equation (8):

$$\Delta d_{13} = \frac{l_1 - l_3}{2} \tag{8}$$

A difference $\Delta d_{14}$ of the scanning start position of the fourth beam with respect to the first beam, i.e., a shift in the main scanning direction of the fourth beam with respect to the first beam on the photosensitive body 122 is represented by equation (9):

$$\Delta d_{14} = \frac{l_1 - l_4}{2} \tag{9}$$

By storing in advance the differences $\Delta d_{12}$, $\Delta d_{13}$, and $\Delta d_{14}$ as the beam information 108b in the ROM 108 and obtaining the adjustment data of the first beam (the position in the main scanning direction on the photosensitive body 122), the positions in the main scanning direction of the second, third, and fourth beams on the photosensitive body 122 can be calculated on the basis of the adjustment data and the differences $\Delta d_{12}$, $\Delta d_{13}$, and $\Delta d_{14}$ as the beam information 108b.

Based on the positions in the main scanning direction of the first to fourth beams on the photosensitive body 122, the correction data for correcting the main scanning magnifications and the correction data for correcting the scanning start positions (scanning positions) can be obtained. Adjusting the main scanning magnifications and scanning start positions eliminates a shift in scanning position between the scanning lines (beams).

On the basis of these correction data, the image transfer clock (main scanning magnification) and scanning start position for each beam can be so adjusted as not to cause a positional shift in the main scanning direction between the beams. This makes it possible to produce a corrected printout as shown in FIG. 5.

The above-mentioned equations are intended for the case of four beams. If the number of beams is n, $\Delta L_x$ and $l_x$ are respectively represented by equations (10) and (11):

$$\Delta L_{m-1} = \sqrt{r^2 - s^2} - \sqrt{r^2 - (s + (m-1)d)^2} \quad (10)$$

$$l_m = \frac{L - \Delta L_{m-1}}{L} * l_1 \quad (11)$$

where m=2, 3, . . . , n

Calculating the scanning length of each beam in accordance with equations (10) and (11) makes it possible to calculate a shift in the main scanning direction of a specific beam with respect to another beam.

When an image printing apparatus is shipped from a factory, or a photosensitive body is replaced with another one, or the like, the position of the photosensitive body may change. The optical distance L of a polygon mirror as seen from the photosensitive body and the distance s from a point T on the photosensitive body to the first beam (scanning line of the first beam) may change.

As the second embodiment of the present invention, a method of adjusting a beam scanning position (irradiation position with respect to a photosensitive body) when the photosensitive body moves relative to a polygon mirror 301 will be described below.

A method of detecting the movement amount of a photosensitive body when the photosensitive body moves parallel to the traveling direction of a beam will be described first.

Figure 7:
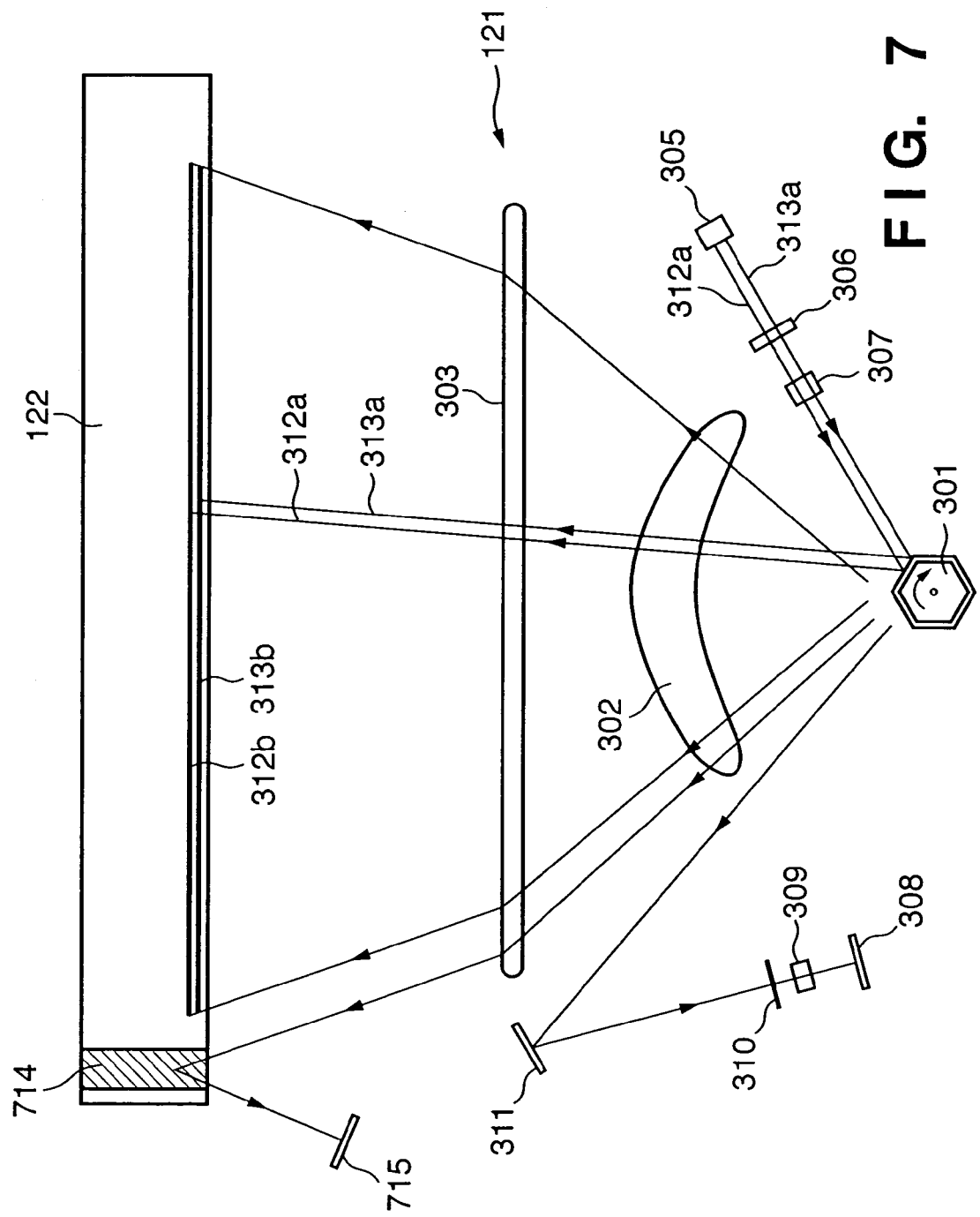
FIG. 7 is a view showing the layout of a beam irradiation unit and photosensitive body.
Figure 8:
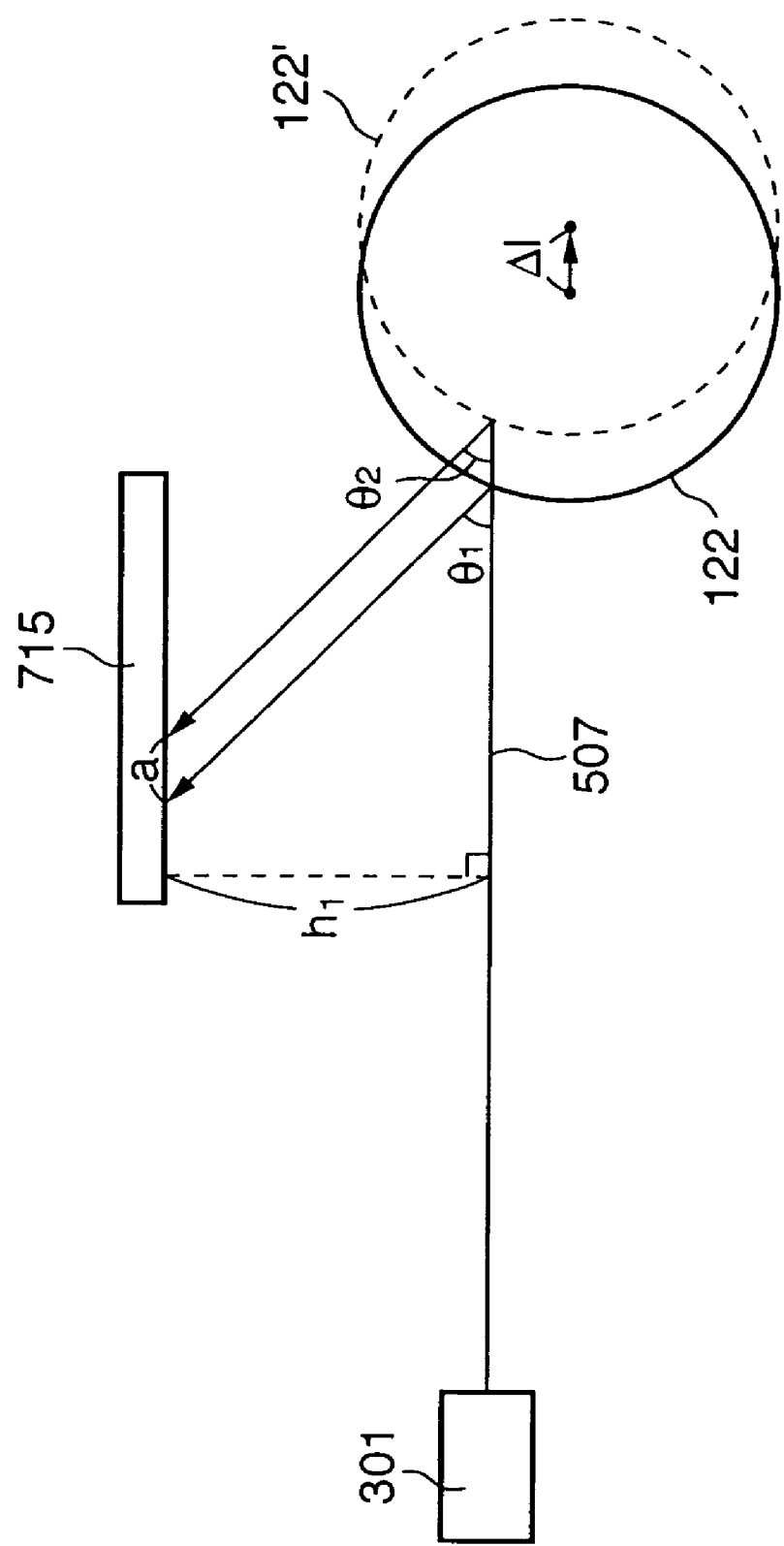
FIG. 8 is a view showing the layout of the beam irradiation unit and photosensitive body.

FIGS. 7 and 8 are views showing the layout of a beam irradiation unit 121 and photosensitive body 122. In FIGS. 7 and 8, reference numeral 714 denotes a reflection unit at an end of the photosensitive body 122; and 715, a sensor which detects a beam reflected by the reflection unit. The reflection unit 714 is provided to detect the position of the photosensitive body 122 because the photosensitive body 122 does not reflect laser beams. Referring to FIG. 8, reference numeral 122' denotes the photosensitive body 122 after movement. The sensor 715 has, e.g., a surface on which a plurality of photoelectric conversion elements (e.g., photodiodes) are arranged and can detect a beam irradiation position with respect to the sensor surface.

Let $h_1$ be the distance between a first beam 507 and the sensor 715, and a, a difference in beam irradiation position with respect to the sensor 715 before and after movement. As can be seen from FIG. 8, the incident angle (let $\theta_1$ be an incident angle before movement of the photosensitive body 122, and $\theta_2$ be an incident angle after movement) of each beam does not change after movement of the photosensitive body 122 ($\theta_1 = \theta_2$), and thus, a movement amount $\Delta l$ of the center of the photosensitive body 122 is equal to a. The movement amount $\Delta l$ of the photosensitive body 122 can be detected on the basis of the irradiation position of a reflected beam with respect to the surface of the sensor 715.

Figure 9:
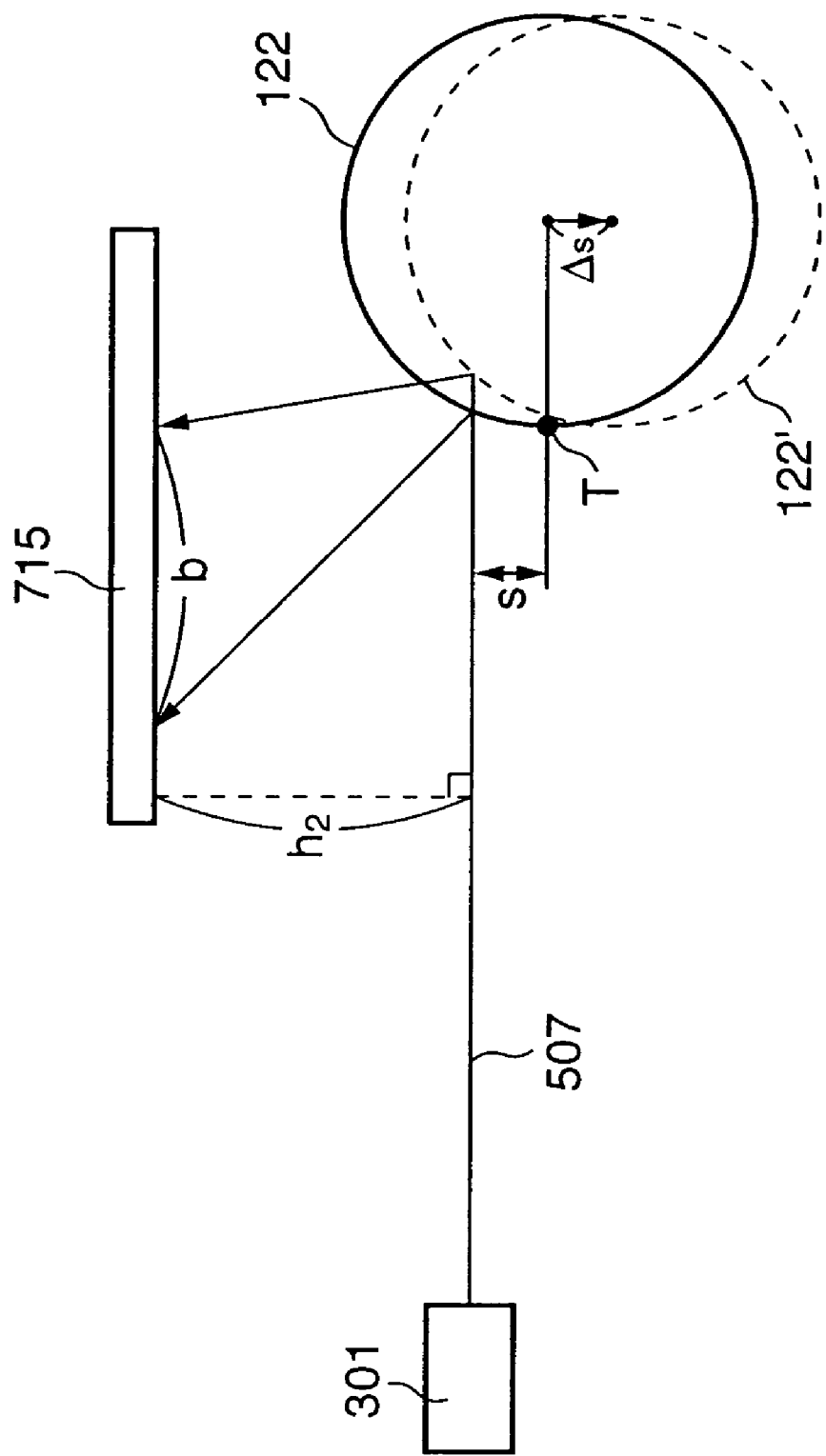
FIG. 9 is a view showing the layout of the beam irradiation unit and photosensitive body.

A method of detecting the relative movement amount of the photosensitive body 122 when the photosensitive body moves relatively in a direction perpendicular to a beam traveling direction (the influence of the movement may appear as a change in image printing position in a sub-scanning direction) will be described. In this case, a distance s from a point T on the photosensitive body 122 to the first beam 507 changes. FIG. 9 shows the photosensitive body 122 before and after movement in the direction perpendicular to the beam traveling direction. Reference numeral 122' denotes the photosensitive body 122 after movement.

Letting $h_2$ be the distance between the first beam 507 and the sensor 715, and b, a difference in beam irradiation position with respect to the sensor 715 between before and after movement of the photosensitive body 122, a movement amount $\Delta s$ of the center of the photosensitive body 122 can be obtained. A variation in beam irradiation position caused by movement of the photosensitive body 122 in the sub-scanning direction can be detected.

Figure 10:
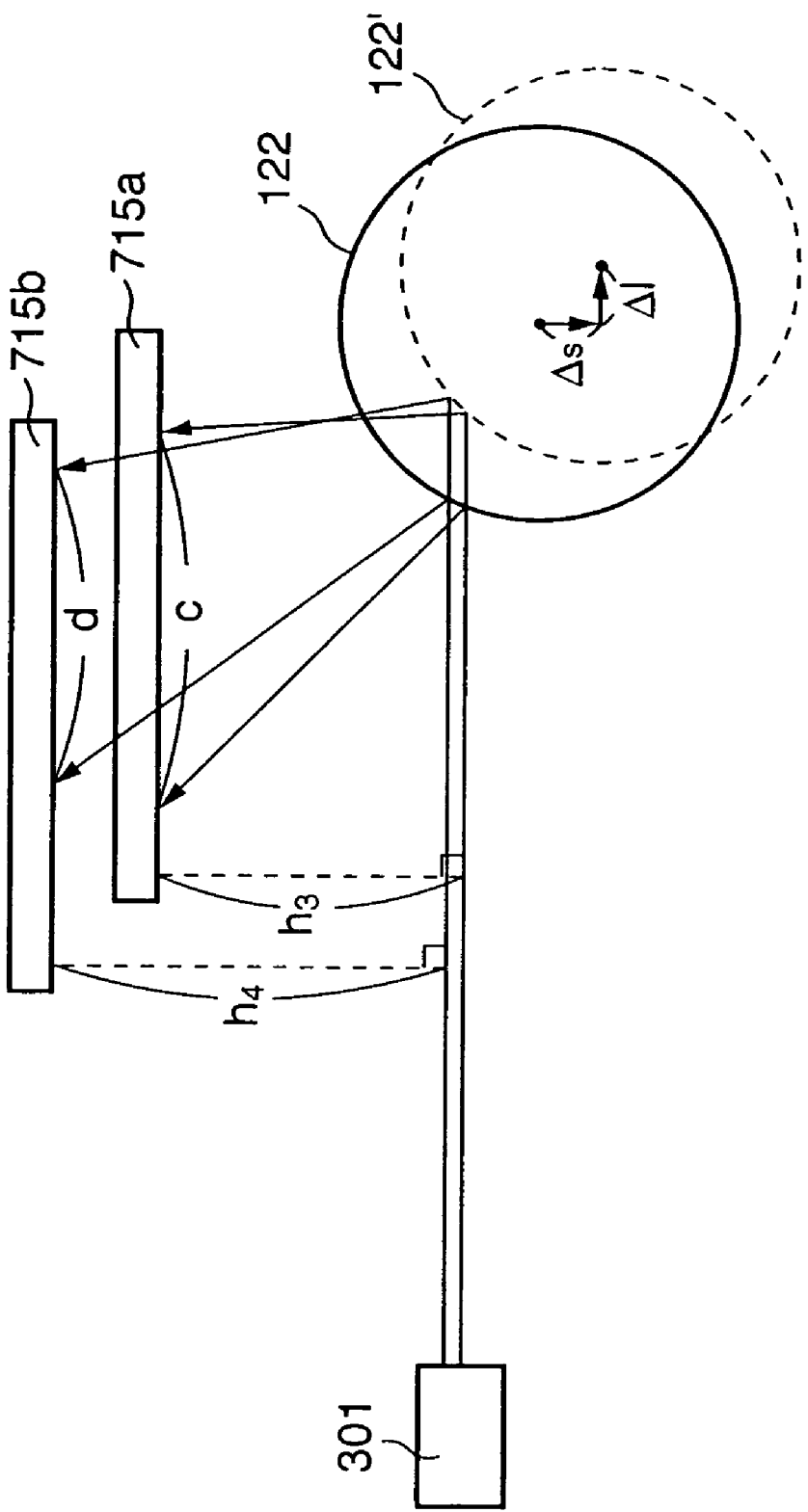
FIG. 10 is a view showing the layout of the beam irradiation unit and photosensitive body.

A method of detecting a change in beam irradiation position with respect to the photosensitive body 122 when distances in two directions, i.e., an optical distance L between the photosensitive body 122 and the polygon mirror 301 and the distance s from the point T on the photosensitive body 122 to the first beam 507 change will be described with reference to FIG. 10. Reference numeral 122' denotes the position of the photosensitive body 122 after movement.

Reference numerals 715a and 715b denote the first sensor and second sensor, respectively. These sensors each have the same arrangement as that of the sensor 715. The movement amounts $\Delta l$ and $\Delta s$ of the center position of the photosensitive body 122 can be calculated from distances $h_3$, $h_4$, c, and d. With this operation, a change in beam irradiation position with respect to the photosensitive body 122 can be detected.

With the above-mentioned detection methods, test patterns need not be formed for all of a plurality beams. By forming test patterns for only at least some (e.g., one) of the beams, a beam irradiation position with respect to a photosensitive body can be detected. Since the position of a photosensitive body can be detected even when the photosensitive body moves relative to a polygon mirror, a beam irradiation position with respect to the photosensitive body can be detected using test pattern formation. Data of an irradiation position thus detected is used as adjustment data to generate, for each beam, correction data for correcting the main scanning magnification and one for correcting the scanning start position, thereby adjusting the image transfer clock and scanning start position. This makes it possible to correct the scanning position.

The above-mentioned embodiments are directed to an image printing apparatus comprising one photosensitive body. The present invention, however, can be applied to a color image printing apparatus comprising, e.g., four photosensitive bodies.

The present invention can also be applied to a copying machine, facsimile apparatus, and the like having scanner function and print function, in addition to an image printing apparatus having only a print function.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-413818 filed on Dec. 11, 2003, the entire contents of which is hereby incorporated by reference herein.

What is claimed is:

1. An image printing apparatus which prints an image using a plurality of beams, comprising:
   a beam irradiation unit which irradiates a photosensitive body with the plurality of beams;
   a detection unit which detects irradiation positions of at least some of the plurality of beams with respect to the photosensitive body; and
   a correction unit which corrects the irradiation position of each of the plurality of beams with respect to the photosensitive body on the basis of predetermined beam information and the irradiation positions detected by said detection unit.

2. The apparatus according to claim 1, wherein
   test patterns are formed by developing latent images formed on the photosensitive body by the at least some beams, and
   said detection unit is arranged to detect the irradiation positions of the at least some beams with respect to the photosensitive body by detecting positions of the test patterns.

3. The apparatus according to claim 1, wherein
   latent images formed on the photosensitive body by the at least some beams are developed and then transferred by a transfer unit, and
   said detection unit is arranged to detect the irradiation positions of the at least some beams with respect to the photosensitive body by detecting positions of images transferred by the transfer unit.

4. The apparatus according to claim 1, wherein the irradiation positions comprise scanning start positions and scanning lengths of the at least some beams for the photosensitive body.

5. The apparatus according to claim 1, wherein said detection unit is arranged to detect the irradiation positions of the at least some beams with respect to the photosensitive body by detecting a relative position of the photosensitive body with respect to said beam irradiation unit.

6. The apparatus according to claim 5, wherein said detection unit includes a surface sensor and detects the relative position of the photosensitive body using positions at which the surface sensor is irradiated with the at least some beams reflected by a reflection unit provided for the photosensitive body.

7. The apparatus according to claim 6, wherein the reflection unit is arranged at an end of the photosensitive body.

8. The apparatus according to claim 1, wherein the beam information contains information indicating a relative positional relationship between the plurality of beams on the photosensitive body.

9. An image printing method of printing an image using a plurality of beams, comprising:
   a detection step of detecting irradiation positions of at least some of the plurality of beams with respect to a photosensitive body; and
   a correction step of correcting the irradiation position of each of the plurality of beams with respect to the photosensitive body on the basis of predetermined beam information and the irradiation positions detected in the detection step.

10. The method according to claim 9, further comprising
    a test pattern formation step of forming test patterns by developing latent images formed on the photosensitive body by the at least some beams,
    wherein in the detection step, the irradiation positions of the at least some beams with respect to the photosensitive body are detected by detecting positions of the test patterns.

11. The method according to claim 9, further comprising
    a transfer step of developing latent images formed on the photosensitive body by the at least some beams and transferring the images by a transfer unit,
    wherein in the detection step, the irradiation positions of the at least some beams with respect to the photosensitive body are detected by detecting positions of images transferred in the transfer step.

12. The method according to claim 9, wherein the irradiation positions comprise scanning start positions and scanning lengths of the at least some beams for the photosensitive body.

13. The method according to claim 9, wherein in the detection step, the irradiation positions of the at least some beams with respect to the photosensitive body are detected by detecting a relative position of the photosensitive body with respect to a beam irradiation unit which irradiates the photosensitive body with the plurality of beams.

14. The method according to claim 13, wherein in the detection step, the relative position of the photosensitive body is detected using positions at which a sensor surface is irradiated with the at least some beams reflected by a reflection unit provided for the photosensitive body.

15. The method according to claim 14, wherein the reflection unit is arranged at an end of the photosensitive body.

16. The method according to claim 9, wherein the beam information contains information indicating a relative positional relationship between the plurality of beams on the photosensitive body.

* * * * *